UNITED STATES PATENT OFFICE.

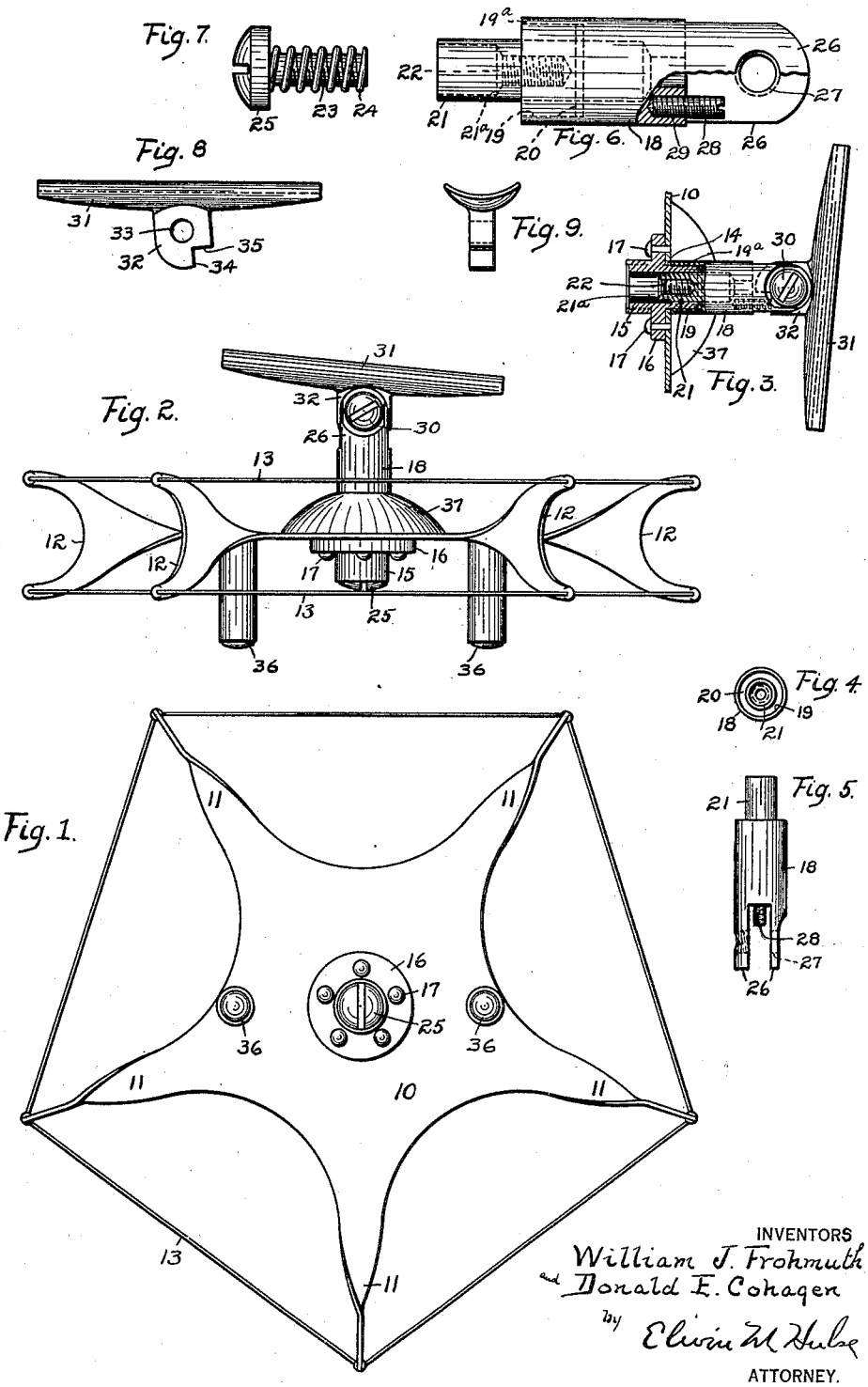

WILLIAM J. FROHMUTH AND DONALD E. COHAGEN, OF FORT WAYNE, INDIANA.

REEL.

1,398,185.  Specification of Letters Patent.  Patented Nov. 22, 1921.

Application filed December 8, 1919. Serial No. 343,227.

*To all whom it may concern:*

Be it known that we, WILLIAM J. FROHMUTH and DONALD E. COHAGEN, citizens of the United States, residing at Fort Wayne, in the county of Allen and State of Indiana, have invented new and useful Improvements in Reels, of which the following is a specification.

The invention relates to reels and particularly to fishing reels of the type commonly known as "spider" reels. The object of the invention is to provide a construction having simplicity, durability and efficiency and which shall be equipped with an adjustable support by which it is adjustably mounted on a fishing pole.

In the use of the aforesaid type of reels the reel is required to be supported from the side of the fishing pole in order that it may be properly operated to wind and unwind the line, this being due to the relatively large diameter of the reel body and to the fact that the body is rotated directly without the intervention of gears. The proper mounting of the reel on the fishing pole heretofore has been difficult and often impossible because of inability of secure alinement of the reel body with the line guides on the pole. By our invention perfect alinement is readily attained so that the reel is adapted for use with any make of pole.

In the accompanying drawings we have illustrated a simple form of the invention in which—

Figure 1 is a front elevational view of the reel; Fig. 2 a plan view of the same; Fig. 3 a plan view of the same partly in section; Fig. 4 an end view of shaft carrying post; Fig. 5 a side elevational view of the same; Fig. 6 an enlarged plan view of shaft carrying post; Fig. 7 an enlarged plan view of the tension screw and spring; Fig. 8 a plan view of the support and Fig. 9 and end view of the same.

Referring to the drawings, the reel body consists of a plate 10 having a plurality of radial arms 11 which are twisted at their outer ends at right angles to the plane of the plate, and the extremities of the arms are recessed or cut out to form line receiving recesses 12 which are parallel to the axis of the plate. Reinforcing members 13 are secured to the ends of the arms and serve not only to stiffen the reel body but also to guide the line in reeling-in the same and to prevent the same from dropping down or over the sides of the body. Handles 36 are secured to the plate 10 preferably at diametrically opposite points by which the reel body may be rotated. The plate is centrally apertured at 14 and a hub 15 having a flange 16 suitably secured to the plate, as by rivets 17, projects through aperture 14. A post 18 is longitudinally bored out and shaft 21 is rigidly secured in the bore, one end of the shaft projecting a suitable distance from the post. The portion 19 of the post bore is of greater diameter than the remainder of the bore to form a sleeve $19^a$ on the post with an annular space between the sleeve and shaft. The rear end of the hub extends into the annular space when assembled and is borne by the shaft and sleeve. A suitable washer 20 is in the end of the annular space against which the end of the hub bears and rotates. The forward end of the shaft is bored out and a portion 22 of the bore is threaded to receive screw 23 having thereon a coiled spring 24 and head 25. The rear end of the spring engages shoulder $21^a$ in the shaft and its opposite end abuts the head of the screw. By tightening the screw in the shaft bore the head of the same abuts the forward end of the hub and places tension on the spring to control the pressure of the hub on washer 20 and thereby control the tension on the reel body to produce easy revolution or difficult revolution of the same as desired. The post and shaft therefore constitute the bearing for the reel body the tension on the same being controlled by the screw and spring, The rear end of the post is formed with bifurcations 26 and alined openings 27 are formed therein, one of which is threaded to receive screw 30. A stud 28 is threaded into opening 29 formed in the post between the bifurcations, the stud being rotated to regulate the distance the same shall project from the post.

Support 31 is adapted to be attached to the handle of the fish pole in the usual manner. A lug 32 projects from the support and is apertured at 33. A notch 34 is formed in the edge of the lug, its base 35 being preferably at a right angle to the side wall thereof. The lug is adapted to be inserted between bifurcations 26 on post 18, screw 30 being passed through opening 33 for securing the support to the bearing post. By adjusting stud 28 the angularity of the support on the bearing post may be controlled and fixed, since the outer end of the stud abuts the base 35 of notch 34.

In the use of reels of the type described it is required that the reel shall be supported from the side of the pole since the reel body is relatively large in diameter and is rotated by the handles 36 without any gears. In thus supporting the reel on the pole it is essential for proper operation that the reel body and its line receiving recesses shall line up with the line guides on the pole. The adjustable feature of the pole support 31 permits a very refined adjustment of the reel body relatively to the pole so that perfect alinement of the line recesses with the line guides on the pole is readily attained. When the adjustment has once been fixed it is not necessary to again make any adjustment of the reel for the particular pole. Poles of course vary in shape and length but the reel is adjustable to be applied to any pole of which we have knowledge.

For thumbing the reel body in casting in order to retard its revolution at the proper time we suitably secure to the rear side of the plate 10 a curved or spherical member 37 upon which the thumb of the hand holding the pole is placed, the cushion of the thumb being used without injury to it.

What we claim is:

1. In a reel adapted for attachment to the side of a fishing pole or rod, a winding member and a support for the member adapted to be attached to the pole or rod, the said support comprising a base adapted to be clamped on the pole or rod and a shaft carrying member pivotally mounted on the base and positive adjusting means carried by the shaft carrying member and coöperating with the base to adjust the longitudinal axis of the shaft carrying member with respect to the longitudinal axis of the base.

2. In a reel adapted for attachment to the side of a fishing pole or rod, a winding member and a support for the member comprising a base portion adapted to be attached to the side of the pole or rod, a shaft carrying member pivotally mounted at one end on the base portion, and an adjusting member carried by the latter member and adapted to abut the base portion to regulate the angle between the said member and said base portion.

3. In a reel adapted for attachment to the side of a fishing pole or rod, a winding member and a support for the member comprising a base portion adapted to seat upon the side of the fishing pole or rod and having a cut out portion on its forward face, a shaft supporting member pivotally mounted on the base portion and a revoluble member carried by the shaft supporting member and adapted to abut the base portion in said cut-out portion for adjusting the angularity of the supporting member with respect to the base portion.

In witness whereof we have hereunto subscribed our names this 28th day of November, 1919.

WILLIAM J. FROHMUTH.
DONALD E. COHAGEN.